US012239109B2

(12) United States Patent
Wang et al.

(10) Patent No.: US 12,239,109 B2
(45) Date of Patent: Mar. 4, 2025

(54) HOLDING TANK MONITORING SYSTEM BASED ON WIRELESS SENSOR NETWORK AND MONITORING METHOD

(71) Applicants: Lishao Wang, Halifax (CA); Shiwei Liu, Lehi, UT (US); Xiaoge Cheng, Beijing (CN); Qiaowei Liu, Lianyungang (CN); Riming Hao, Beijing (CN)

(72) Inventors: Lishao Wang, Halifax (CA); Shiwei Liu, Lehi, UT (US); Xiaoge Cheng, Beijing (CN); Qiaowei Liu, Lianyungang (CN); Riming Hao, Beijing (CN)

( * ) Notice: Subject to any disclaimer, the term of this patent is extended or adjusted under 35 U.S.C. 154(b) by 529 days.

(21) Appl. No.: 17/400,472

(22) Filed: Aug. 12, 2021

(65) Prior Publication Data
US 2022/0079125 A1 Mar. 17, 2022

Related U.S. Application Data

(60) Provisional application No. 63/079,112, filed on Sep. 16, 2020.

(51) Int. Cl.
*A01K 63/04* (2006.01)
*A01K 63/00* (2017.01)
(Continued)

(52) U.S. Cl.
CPC ............ *A01K 63/04* (2013.01); *A01K 63/003* (2013.01); *C02F 1/008* (2013.01); *G06N 20/00* (2019.01); *H04L 67/125* (2013.01); *H04W 4/38* (2018.02)

(58) Field of Classification Search
CPC ...... A01K 63/04; A01K 63/003; A01K 61/00; A01K 61/10; A01K 63/006; A01K 63/045;
(Continued)

(56) References Cited

U.S. PATENT DOCUMENTS

2016/0174531 A1* 6/2016 Boothe ............... F04D 13/0686
119/260
2018/0332830 A1* 11/2018 Gordon ............... B01D 61/025
(Continued)

FOREIGN PATENT DOCUMENTS

| CN | 112003948 A | * | 11/2020 | ............ H04L 67/12 |
| KR | 20140114089 A | * | 9/2014 | ............ A01G 9/26 |
| KR | 20170045079 A | * | 4/2017 | ............ A01K 63/04 |

OTHER PUBLICATIONS

English translation of Lee Patent Publication KR-20170045079A, published Apr. 26, 2014. (Year: 2014).*

(Continued)

*Primary Examiner* — Joseph W Drodge

(57) ABSTRACT

In the breeding of aquatic products, keeping track of changes in the water quality environment is an urgent aquaculture problem to be solved. At present, single sensors are often used for data detection, and there is no coordination between the sensors or between sensors and actuators, resulting in a lack of a unified monitoring and control mechanism. The current invention discloses a holding tank monitoring system based on a wireless sensor network and a monitoring method provided thereof characterized by an unattended operation and automated execution by obtaining environmental data of a holding tank in real-time, and analyzing the data using a suitably trained machine learning algorithm and causing a control action on the actuator to perform a corrective action on the holding tank for optimal operation of the system.

9 Claims, 5 Drawing Sheets

(51) Int. Cl.
   *C02F 1/00*       (2023.01)
   *G06N 20/00*      (2019.01)
   *H04L 67/12*      (2022.01)
   *H04L 67/125*     (2022.01)
   *H04W 4/38*       (2018.01)

(58) Field of Classification Search
   CPC ....... G06N 20/00; H04L 67/125; H04W 4/38; C02F 1/008; C02F 3/006; C02F 2101/10; C02F 2101/20; C02F 2209/006; C02F 2209/008; C02F 2209/02; C02F 2209/11; C02F 2209/40
   See application file for complete search history.

(56) References Cited

U.S. PATENT DOCUMENTS

2020/0117580 A1*  4/2020  Lekivetz .............. G06F 11/368
   2020/0170227 A1*  6/2020  Rishi .................. G06V 40/20
   2021/0061675 A1*  3/2021  Bishop ................. C02F 1/008
   2021/0088450 A1*  3/2021  Clark .................. G01N 21/77

OTHER PUBLICATIONS

English translation of Kim Patent Publication KR-20140114089A, published Sep. 26, 2017. (Year: 2017).*

English translation of Cao Patent Publication CN-112003948, published Nov. 27, 2020. (Year: 2020).*

* cited by examiner

HOLDING TANK MONITORING SYSTEM BASED ON WIRELESS SENSOR NETWORK AND MONITORING METHOD

FIELD OF INVENTION

The current invention in some embodiments thereof, relates to the field of the Internet of Things and artificial intelligence. More specifically, the present invention relates to using the IoT structure and machine learning technologies to build a new water quality monitoring system with a real-time monitoring and corrective capability.

RELATED APPLICATIONS

In some aspects, this application may claim benefit from several patent applications and prior art literature including:

U.S. Ser. No. 10/436,615B2: A sensing system includes a sensor assembly that is communicably connected to a computer system, such as a server or a cloud computing system. The sensor assembly includes a plurality of sensors that sense a variety of different physical phenomena. The sensor assembly featurizes the raw sensor data and transmits the featurized data to the computer system. Through machine learning, the computer system then trains a classifier to serve as a virtual sensor for an event that is correlated to the data from one or more sensor streams within the featurized sensor data. The virtual sensor can then subscribe to the relevant sensor feeds from the sensor assembly and monitor for subsequent occurrences of the event. Higher order virtual sensors can receive the outputs from lower order virtual sensors to infer nonbinary details about the environment in which the sensor assemblies are located.

KR20140114089A: The present invention relates to horticultural facility controlling system and, more specifically, to horticultural facility monitoring and controlling system and controlling method which can monitor environment and mechanical devices in a horticultural facility and control the same with a smart device and a computer connected with internet. The system in the present invention accurately controls temperature, humidity, CO2, and light condition of a horticultural facility according to an optimum control value based on database data to have an optimum growing environment for growing steps of crops to reduce energy and make remote monitoring of facility environment and multistage control of such as devices, window, and curtain possible from outside to improve the quality of crops produced in the horticultural facility, and comprises a camera unit, a sensor unit, a control means, a local control unit, and a center server.

CN112003948A: The invention provides an intelligent agricultural Internet of things system, which comprises an agricultural data collection module, an agricultural data analysis module, a remote server and a data early warning module, wherein the agricultural data collection module remotely transmits data to the agricultural data analysis module through a satellite, the agricultural data analysis module is in signal connection with the remote server through a local area communication network, the remote server collects and counts agricultural information and then transmits the agricultural information to the data early warning module in an electric signal mode, the data early warning module displays the agricultural data information of each planting base, and the data early warning module comprises agricultural environment information, planting crop growth information of the same planting base and development information of a planting crop of each planting base, the intelligent agricultural Internet of things system can help a grower to analyze the planting crop growth information of the same planting base and the development information of the planting crop of each planting base, thereby improving the judgment capability of the development planning of the self organism and improving the agricultural planting efficiency.

CN110825058A: The invention discloses an agricultural real-time monitoring system, which comprises a data acquisition system, a data transmission system and an analysis control system, wherein the data acquisition system comprises a soil humidity sensor, a soil nutrient analyzer, a meteorological monitoring station, an insect condition analysis and forecast lamp, a fixed spore capture instrument, a seedling condition and disaster condition monitoring camera and a water and fertilizer all-in-one machine, the data transmission system is a GPRS mobile wireless network, and the analysis control system is ARM upper computer monitoring software and comprises a basic information management module, a system parameter setting module, a real-time data monitoring module, a control module, a data dynamic analysis module and an abnormity early warning module. The invention can monitor, analyze and actively deal with the agricultural system in real time, improve the working efficiency and solve the labor cost.

However, the above cited prior art does not provide a real-time sensor data analysis using a suitably trained machine learning algorithm, whose output is actionable signals processable by an actuator on the holding tank to perform a corrective action on the holding tank to maintain the environment at optimal conditions.

BACKGROUND OF THE INVENTION

With the aquaculture industrialization and improvement of precision farming, for industrialized farming, keeping track of dynamic changes in the water quality environment in time is an important problem to be solved urgently. Each aquaculture animal or plant needs a water quality environment suitable for its survival. If the water quality environment can meet requirements, aquaculture animals and plants can grow and reproduce. If the water in the water quality environment is contaminated somehow, or some water quality indexes exceed the range of adaptation and tolerance of aquaculture animals or plants, a large number of aquaculture animals and plants may die, resulting in direct economic losses.

In recent years, a great many scholars have contributed a great deal of research on aquaculture monitoring technologies, and the precision management level of traditional aquaculture has been effectively improved. In the prior art, single sensors are often used for data detection, for example, flow meters are mounted on the water inlet and outlet pipes, and salinity and dissolved oxygen concentration sensors are mounted in the tank. Moreover, signal transmitters and data display units can only be mounted in the vicinity of the sensors. In some improvements, sensor data may be collected and transmitted to a remote central computer for remote monitoring. However, there is still need for manual periodic inspection of record data, and emergency measures are taken after abnormalities are found.

Moreover, there is no connection between the sensors and between the sensors and actuators, resulting in a lack of a unified monitoring and control mechanism, so it is impossible to use computer and network technologies for automatic control. In most cases, manual observation or periodic inspection is required to measure and record data, which is laborious, error-prone, and poor real-time performance. To solve these problems associated with the prior art and to improve the overall technology, the current invention discloses a holding tank monitoring system based on a wireless sensor network and a monitoring method provided thereof characterized by an unattended operation and automated execution by obtaining environmental data of a holding tank in real-time, and analyzing the data using a suitably trained machine learning algorithm and causing a control action on the actuator to perform a corrective action on the holding tank for optimal operation of the system.

SUMMARY

The following summary is an explanation of some of the general inventive steps for the device, method, manufacture and apparatus in the description. This summary is not an extensive overview of the invention and does not intend to limit the scope beyond what is described and claimed as a summary.

The current invention in some embodiments thereof, relates to the field of the Internet of Things and artificial intelligence. More specifically, the present invention relates to using an IoT structure and a machine learning model to build a new water quality monitoring system with a real-time monitoring and corrective capability.

In summary, the disclosed system comprises of a holding tank capable of supporting an aquatic life form, a plurality of sensors on the holding tank capable of determining at least one or more conditions in the holding tank, and capable of transmitting detected condition to a remote computer, a micro-controller, an actuator with a corrective measure for the at least one or more conditions in the holding tank determined by the sensor and a communication module with a network receiver, the module capable of receiving signals from a remote computer, where received signals are processed by the micro-controller to activate the actuator to perform a corrective measure for the at least one or more conditions in the holding tank determined by the sensor.

Further comprised in the system is a remote computer comprising of at least a processor, memory and storage, capable of receiving from above sensors detected condition for at least one or more conditions in the holding tank. The computer receives the conditions from the sensor, stores received condition in a database. The computer uses a suitably trained machine learning algorithm to determine the conditions that would be optimal for the aquatic life form in the holding tank and generates a corrective signal e.g. temperature, turbidity, mineral composition etc, and transmits the signal to the communication module, which makes the actuator to take a corrective action, and finally a monitoring and control device.

In an exemplary embodiment, the holding tank is any such tank capable of supporting an aquatic life form e.g. fish, plants or any such in an aqueous environment. For purposes of this this disclosure the aquatic life form anticipated is a fish, however, other life form are also anticipated. Water quality is the most important factor affecting fish health and performance in aquaculture production systems. There is need to understand the water quality requirements of the fish under culture very well. Fish live and are totally dependent on the water they live in for all their needs. Different fish species have different and specific range of water quality aspects (temperature, pH, oxygen concentration, salinity, hardness, etc.) within which they can survive, grow and reproduce.

Further, according to the current disclosure, the sensors in the holding tank are capable of determining at least one or more conditions in the holding tank, and capable of transmitting detected condition to a remote computer. Some of these sensors could be capable of detecting one or more of the following: Temperature, Turbidity, Water pH and acidity, Alkalinity and hardness, Dissolved gases: oxygen, carbon dioxide, nitrogen, Ammonia content, Toxic materials among others According to an exemplary arrangement, the micro-controller is configured to operate the actuator to make a corrective measure for the at least one or more conditions in the holding tank based on a corrective signal received from a remote computer configured with a suitable machine learning algorithm, where the corrective signal is derived from learning based on a plurality of inputs from a plurality of holding tanks.

According to an exemplary arrangement, the actuator comprises of a corrective measure for the at least one or more conditions in the holding tank determined by the sensor, for example, it could be heater to increase temperature, a fan to reduce temperature, a filter to remove ammonia, a mechanism to pass air into the tank to increase dissolved oxygen, a filter to remove suspended particles, a chemical to alter to pH etc. The actuator receives a corrective signal from a micro-controller.

According to an exemplary arrangement, the communication module comprises of a network receiver, the module capable of receiving signals from a remote computer, where received signals are processed by the micro-controller to activate the actuator to perform a corrective measure for the at least one or more conditions in the holding tank determined by the sensor.

According to an exemplary arrangement, the remote computer comprised of at least a processor, memory and storage. The memory of the remote computer is configured with a suitably trained machine learning algorithm. Such an algorithm could comprise of any such trained algorithm such as: Linear Regression, Logistic Regression, Decision Tree, SVM, Naive Bayes, kNN, K-Means, Random Forest, Dimensionality Reduction, Gradient Boosting algorithms etc.

Additionally, the productivity of all holding tanks is measured and recorded in a suitable storage device, so as to be able to determine the correlation between detected conditions and the productivity. For purposes of this disclosure, the productivity could be the average fish size, the quantity of produced fish, the rate of reproduction, disease rate, the weight of fish produced or even mortality rate of fish.

The remote computer receives the conditions from the sensor, stores received condition in a database. The computer uses a suitably trained machine learning algorithm to determine the conditions that would be optimal for the aquatic life form in the holding tank and generates a corrective signal e.g. temperature, turbidity, mineral composition etc, and transmits the signal to the communication module, which makes the actuator to take a corrective action. The corrective action is automatically generated, and the signals provided are improved over time based on a learning model and thus offer a novel and patentable solution.

According to an exemplary arrangement, a method of training the ML algorithm is described as comprising of the steps of:
Collecting the productivity data of the aquatic life in a holding tank for a plurality of tanks Collect the corresponding sensor conditions correlating to the productivity data Split the data into training data set and validation data set Using a suitable algorithm, use the training data set of sensor conditions to predict the productivity and obtain a ML model Use the validation data set to verify the accuracy of the model Select the best ML model for your data set

BRIEF DESCRIPTION OF THE DRAWINGS

The novel features believed to be characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION OF THE DRAWINGS

Hereinafter, the preferred embodiment of the present invention will be described in detail with reference to the accompanying drawings. The terminologies or words used in the description and the claims of the present invention should not be interpreted as being limited merely to their common and dictionary meanings. On the contrary, they should be interpreted based on the meanings and concepts of the invention in keeping with the scope of the invention based on the principle that the inventor(s) can appropriately define the terms in order to describe the invention in the best way.

It is to be understood that the form of the invention shown and described herein is to be taken as a preferred embodiment of the present invention, so it does not expressly limit the technical spirit and scope of this invention. Accordingly, it should be understood that various changes and modifications may be made to the invention without departing from the spirit and scope thereof.

Figure 1:
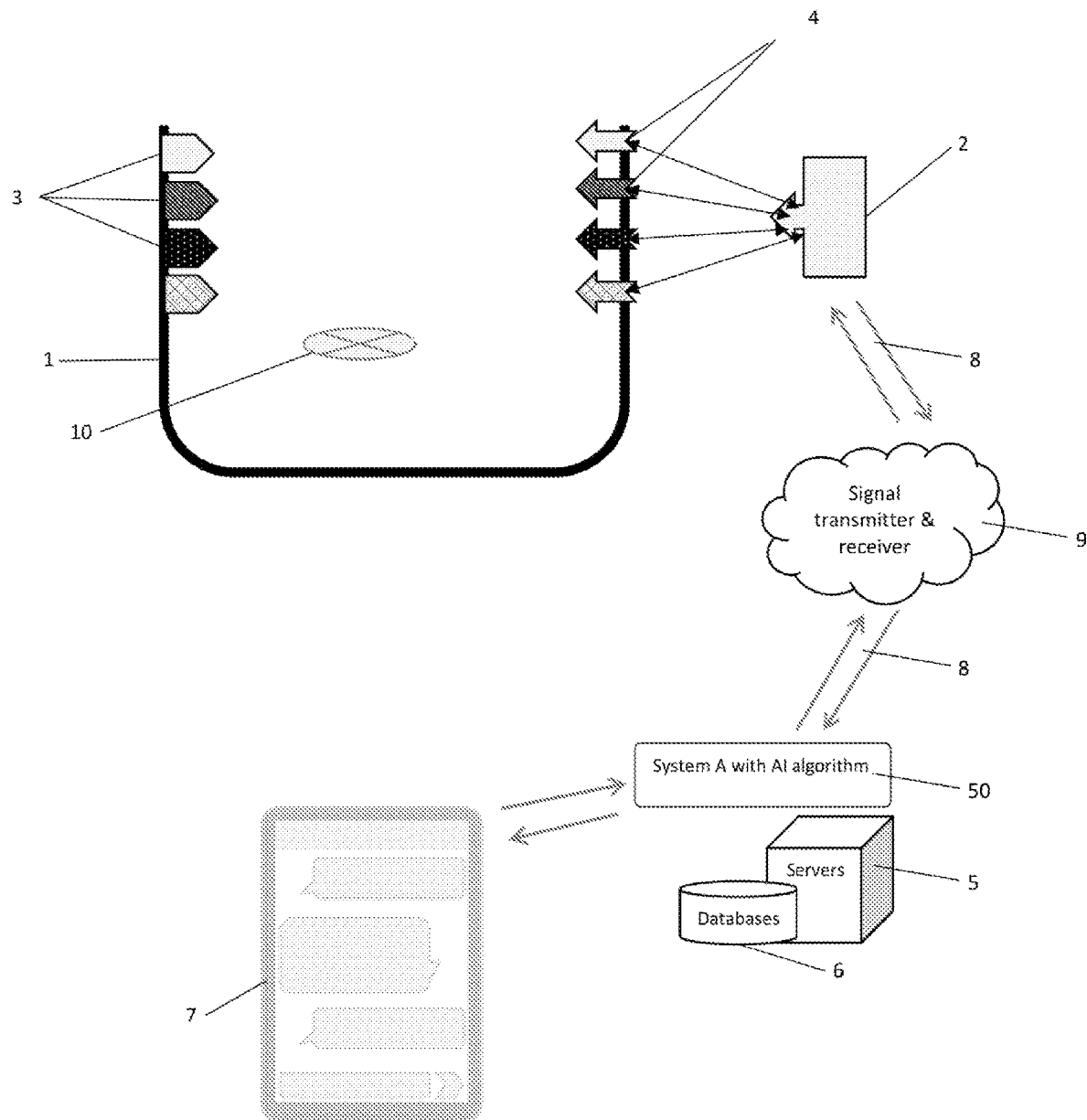
FIG. 1 of the diagrams is a schematic architectural view of the system as described according to the current invention.

In a first embodiment according to FIG. 1 of the diagrams is a schematic architectural view of the system as described according to the current invention. Illustrated in the figure is a holding tank 1, a micro-controller 2, a sensor or plurality of sensors 3, an actuator or plurality of actuators 4, a remote computer or server 5 with a storage device 6, a monitoring and control device 7, a networks 8, a signal receiver and transmitter module 9, an aquatic life 10 as well as a computer-implemented module 50 configured on the remote computer 5, said module comprising a suitably trained machine learning algorithm to determine the conditions that would be optimal for the aquatic life form in the holding tank and generates a corrective signal e.g. temperature, turbidity, mineral composition etc, and transmits the signal to the communication module, which makes the actuator to take a corrective action.

The holding tank 1 is any such tank capable of supporting an aquatic life form e.g. fish, plants or any such in an aqueous environment. There are numerous instances where fish is the preferred example of aquatic life in this disclosure, however, other life form are also anticipated. As an example, water quality is the most important factor affecting fish health and performance in aquaculture production systems, and the same is true to may aquatic life forms. Good water quality refers to what the fish life thrives best. This means that a farmer must understand the water quality requirements of the fish under culture very well. Fish live in and are totally dependent on the water they live in for all their needs. Additionally, different fish species have different and specific range of water quality aspects, which may include one or more of the temperature, pH, oxygen concentration, salinity, hardness, etc. within which they can survive, thrive, grow and reproduce.

Within these tolerance limits, each species has its own optimum range, that is, the range within which it performs best. It is therefore very important for fish producers to ensure that the physical and chemical conditions of the water remain, as much as possible, within the optimum range of the fish under culture all the time. Outside these optimum ranges, fish will exhibit poor growth, erratic behaviour, and disease symptoms or parasite infestations. Under extreme cases, or where the poor conditions remain for prolonged periods of time, fish mortality may occur. Holding tank water contains two major groups of substances: (a) suspended particles made of non-living particles and very small plants and animals, the plankton, and (b) dissolved substances made of gases, minerals and organic compounds.

It should be understood that the composition of holding tank water changes continuously, depending on climatic and seasonal changes, the flow of water, and on how a holding tank is used. It is the aim of good management to control the composition to yield the best conditions for the fish. For producers to be able to maintain ideal holding tank water quality conditions, they must understand the physical and chemical components contributing to good or bad water quality. Sensors can provide a great deal of understanding on these conditions.

Further, the micro-controller 2 is configured to operate the actuator 4 to make a corrective measure for the at least one or more conditions in the holding tank based on a corrective signal received from the remote computer 5 configured with a suitable machine learning algorithm, where the corrective signal is derived from learning based on a plurality of inputs preferably from a plurality of holding tanks. It should be noted that the corrective mechanism is activated at any such preferred frequency and autonomously without a manual input, but rather based on a signal from the remote computer.

Now, the sensor or plurality of sensors 3 according to the current disclosure, is capable of determining at least one or more conditions in the holding tank. Preferably located in the holding tank and capable of transmitting detected condition to a remote computer. Some of these sensors could be capable of detecting one or more of the following: Temperature, Turbidity, Water pH and acidity, Alkalinity and hardness, Dissolved gases: oxygen, carbon dioxide, nitrogen, Ammonia content or Toxic materials.

The actuator or plurality of actuators 4 comprise of a mechanism for performing a corrective measure for the at least one or more conditions in the holding tank determined by the sensor 3. For example, it could be heater to heat the water and as such increase the temperature, a fan to blow the surface of the water to reduce temperature, a filter to remove ammonia, a mechanism to pass air into the tank to increase the amounts of dissolved oxygen, a filter to remove suspended particles or a chemical to alter to pH etc. The actuator receives a corrective signal from the micro-controller 2. it should be noted that the signal is received autonomously and the micro-controller activates the actuator actively, but it is also anticipated that there could be an element of human control for the system.

Further in the figure is a a remote computer or server 5 with a storage device 6, wherein according to the current invention, the remote computer 5 comprises of at least a processor, memory and storage. The memory of the remote computer is configured with a suitably trained machine learning algorithm, which makes up the computer-implemented module 50. Such module comprises an algorithm that could comprise of any such trained algorithm such as: Linear Regression, Logistic Regression, Decision Tree, SVM, Naive Bayes, kNN, K-Means, Random Forest, Dimensionality Reduction Algorithms, Gradient Boosting algorithms (GBM, XGBoost, LightGBM, CatBoost), among others. On the other hand, the storage device 6 comprises of a database capable of receiving from above sensors detected condition for at least one or more conditions in the holding tank. For each detected condition, there are inputs from multiple holding tanks, probably at different locations. However, the setup could also work for a single holding tank.

Furthermore, the productivity of all holding tanks (if more than one are included) is measured and recorded, so as to be able to determine the correlation between detected conditions and the productivity. This is preferably performed using the monitoring and control device 7. For purposes of this disclosure, the productivity could be the average fish size, the quantity of produced fish, the rate of reproduction, disease rate, the weight of fish produced or even mortality rate of fish. However, it should be understood that similar metrics for other aquatic life forms could be measured as well, and this only forms a suitable example for a person skilled in the art to perform the invention.

Further still is a network 8, which may comprise of one or more mechanisms capable of transmitting data between any number of computers or any such devices with network interfaces. In the current invention, such networks could comprise broadband networks, fibre optic, Ethernet, cabling, electromagnetic waves etc.

Further still is a signal receiver and transmitter module 9, which comprises of a network receiver, the module capable of receiving signals from a remote computer, where received signals are processed by the micro-controller 2 to activate the actuator 4 to perform a corrective measure for the at least one or more conditions in the holding tank 1 as determined by the sensor 3.

Figure 2:
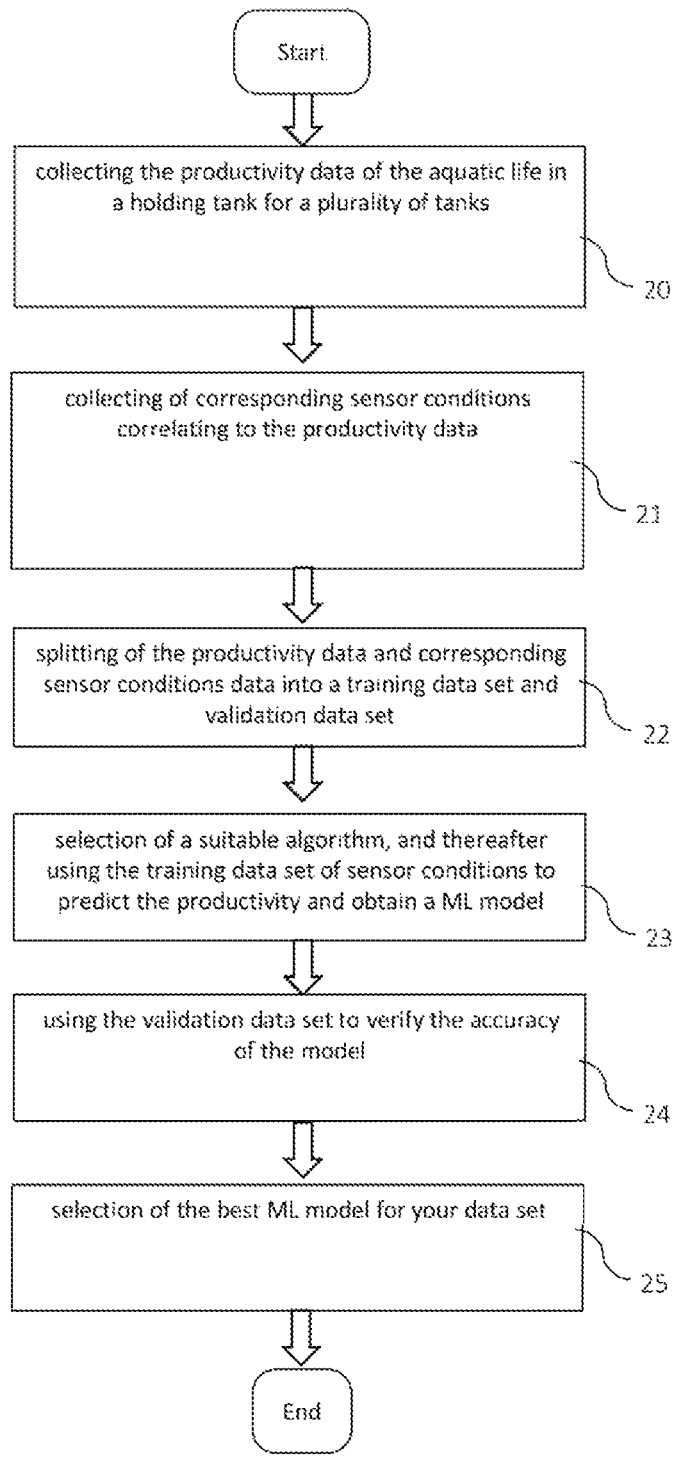
FIG. 2 of the diagrams illustrates the method of training a machine learning algorithm according to the current invention.

In a second embodiment according to the FIG. 2 of the diagrams, it is illustrated a method of training a machine learning algorithm according to the current invention. The method comprises of a step 20 of collecting the productivity data of the aquatic life in a holding tank or a plurality of tanks. The next step 21 entails the collecting of corresponding sensor conditions correlating to the productivity data. In the step 22 is the splitting of the productivity data and corresponding sensor conditions data into a training data set and validation data set. Further in the step 23 is the selection of a suitable algorithm, and thereafter using the training data set of sensor conditions to predict the productivity and obtain a ML model. Subsequently in step 24, is using the validation data set to verify the accuracy of the model. Finally, in the step 25, the method involves the selection of the best ML model for your data set.

Figure 3:
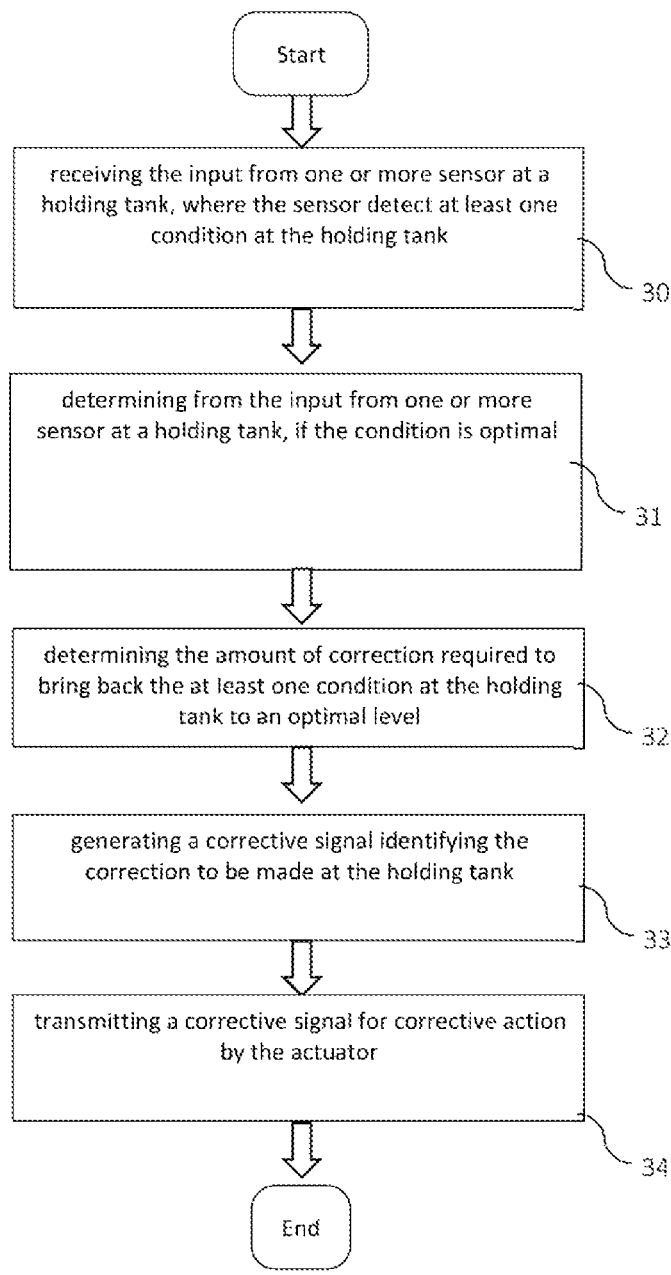
FIG. 3 of the diagrams illustrates a method of using the trained machine learning algorithm according to the current invention.

In a further embodiment according to the FIG. 3 of the diagrams, it is illustrated a method of using the trained machine learning algorithm according to the current invention. The method comprises of a step 30 of receiving at a computing device with a memory configured with a suitably trained machine learning algorithm the input from one or more sensor at a holding tank, where the sensor detect at least one condition at the holding tank. The subsequent step 31 entails determining from the input from one or more sensor at a holding tank, if the condition is optimal, and if not optimal, perform the subsequent step 32 of determining the amount of correction required to bring back the at least one condition at the holding tank to an optimal level. In the subsequent step 33, it is generated a corrective signal identifying the correction to be made at the holding tank. Finally in 34, a corrective signal is transmitted for corrective action by the actuator.

Specifically, a remote computer receives the conditions from the sensor, stores received condition in a database. The computer uses a suitably trained machine learning algorithm to determine the conditions that would be optimal for the aquatic life form in the holding tank and generates a corrective signal e.g. temperature, turbidity, mineral composition etc, and transmits the signal to the communication module, which makes the actuator to take a corrective action. The corrective action is automatically generated, and the signals provided are improved over time based on a learning model.

Figure 4:
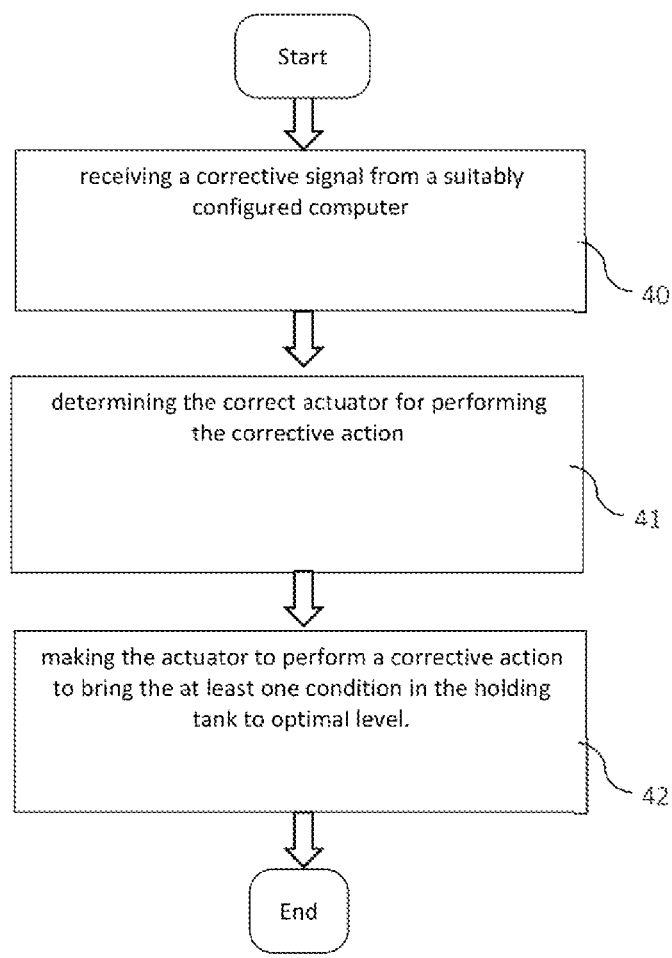
FIG. 4 of the diagrams illustrates the mechanism of activating a control mechanism performed by the actuator for a corrective mechanism according to the current invention.

In the subsequent embodiment according to the FIG. 4 of the diagrams is a mechanism of activating a control mechanism performed by the actuator for a corrective mechanism according to the current invention. The method comprises of a step 40 of receiving a corrective signal from a suitably configured computer, preferably a remote computer. In the subsequent step 41 is the determining the correct actuator for performing the corrective action. It is preferable that a micro-controller makes the determination of the correct actuator, and making the actuator perform the corrective action. Finally, in the step 42 is making the actuator to perform a corrective action to bring the at least one condition in the holding tank to optimal level.

Figure 5:
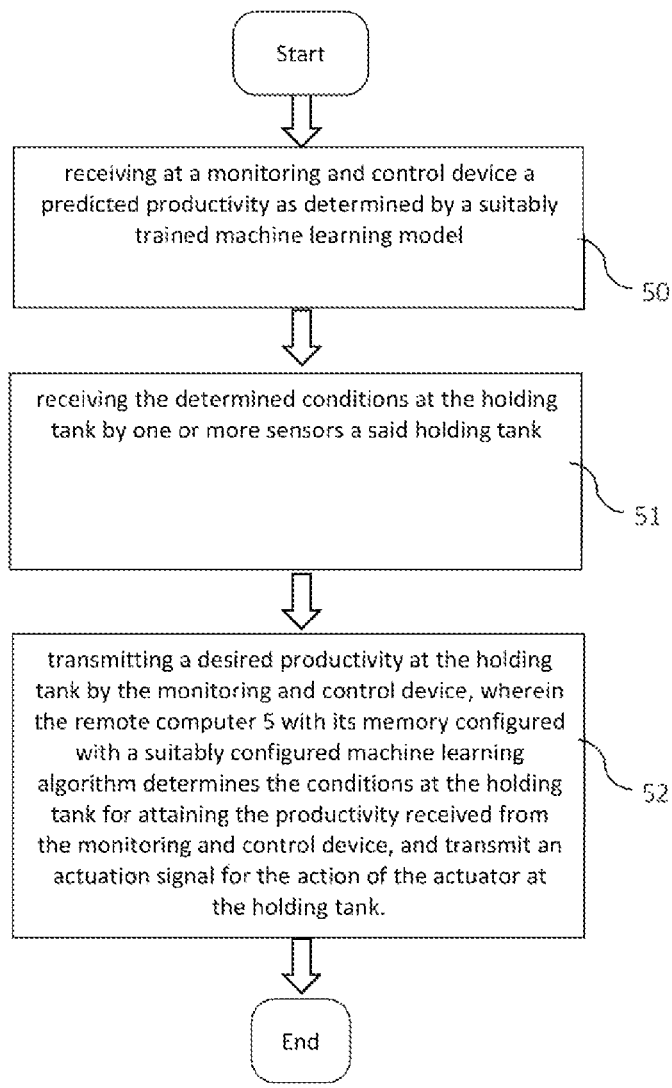
FIG. 5 of the diagrams a control mechanism performed by the monitoring and control device according to the current invention.

In a final embodiment exemplified by the FIG. 5 of the diagrams is illustrated a control mechanism performed by the monitoring and control device according to the current invention. The first step 50 entails receiving at a monitoring and control device a predicted productivity as determined by a suitably trained machine learning model. Next in the step 51 is the receiving the determined conditions at the holding tank by one or more sensors a said holding tank. Finally in the step 52 is the transmitting a desired productivity at the holding tank by the monitoring and control device, wherein the remote computer 5 with its memory configured with a suitably configured machine learning algorithm determines the conditions at the holding tank for attaining the productivity received from the monitoring and control device, and transmit an actuation signal for the action of the actuator at the holding tank.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICATION

The current invention relates to the use and manufacture intelligent holding tanks for aquaculture and remote monitoring and control of the environmental conditions at water tanks.

What is claimed is:

1. A holding tank monitoring system based on a wireless sensor network, the system comprising of:
    a first holding tank capable of supporting an aquatic life form, said tank having one or more sensors thereof for sensing one or more conditions, wherein said one or more sensors being capable of determining one or more conditions selected from a temperature, a turbidity and a mineral composition in the tank in the holding tank, and capable of transmitting the one or more determined conditions to a remote computer;
    one or more actuators for taking one or more corrective measures for the one or more conditions in the holding tank determined by the one or more sensors;
    a micro-controller configured to be capable to operate the one or more actuators to make one or more corrective measures for the one or more conditions in the holding tank based on one or more corrective signals received from a remote computer of the system, in communication with the microcontroller, and configured with a trained machine learning algorithm, where the one or more corrective signals is derived from learning based on a plurality of inputs from a plurality of holding tanks;
    a communication module comprising of a network receiver and transmitter, the module capable of receiving signals from the remote computer, and transmitting sensor inputs to the remote computer;
    a network, and;
    the remote computer comprising of at least a processor, memory and storage device, said computer capable of receiving the one or more determined conditions from the one or more sensors for the one or more conditions in the first holding tank, and storing the received one or more conditions in a database in the storage device, wherein the remote computer's memory is configured with the trained machine learning algorithm to determine optimal conditions for the aquatic life in the first holding tank and generating the one or more corrective signals.

2. The system as in claim 1, further comprising a remote monitoring and control device capable of transmitting a desired productivity at the first holding tank to the remote computer whose memory is configured with the trained machine learning algorithm, wherein said remote computer determines the optimal conditions at the first holding tank for attaining the desired productivity received from the remote monitoring and control device, and subsequently transmitting the generated one or more corrective signals.

3. A method of training a machine learning algorithm for monitoring and control of one or more holding tanks, the method comprising of:
    collecting a productivity data of aquatic life in the one or more holding tanks;
    collecting of corresponding sensor conditions data at the one or more holding tanks correlating to the productivity data by sensors capable of determining the sensor conditions;
    splitting of the productivity data and the corresponding sensor conditions data into a training data set and a validation data set;
    selection of an algorithm, and thereafter using the training data set of sensor conditions to predict the productivity and obtain a trained machine learning algorithm;
    using the validation data set to verify an accuracy of the trained machine learning algorithm; and;
    selecting the verified trained machine learning algorithm for subsequent prediction, and for transmitting of corrective signals to a micro-controller,
    the micro-controller configured to be capable to operate one or more actuators to make one or more corrective measures for the one or more conditions at the one or more holding tanks based on one or more corrective signals.

4. The method of claim 3, further comprising use of the trained machine learning algorithm, the method of use comprising of:
    receiving at a remote computer with a memory configured with the trained machine learning algorithm to use input from the sensors at the one or more holding tanks;
    determining from the input from the sensors at the one or more holding tanks, if the conditions are optimal for productivity of an aquatic life in the one or more holding tanks;
    determining an amount of correction required to bring the conditions at the one or more holding tanks to optimal levels; and,
    generating the corrective signals identifying the corrective measures to be made at the one or more holding tanks.

5. The method of claim 4, wherein the micro-controller is used for determining a correct actuator of the one or more actuators at the one or more holding tanks for action on each of the corrective signals.

6. The method of claim 4, wherein the one or more actuators cause a temperature change at the one or more holding tanks.

7. The method of claim 4, wherein the one or more actuators cause a mineral composition alteration at the one or more holding tanks.

8. The method of claim 4, wherein the one or more actuators cause water flow change at the one or more holding tanks.

9. The method of claim 4, wherein the one or more actuators cause a change in water turbidity at the one or more holding tanks.

* * * * *